No. 786,999. PATENTED APR. 11, 1905.
C. N. ROUNSEVILLE.
HEAT STORAGE BOX.
APPLICATION FILED JAN. 18, 1904.
2 SHEETS—SHEET 1.
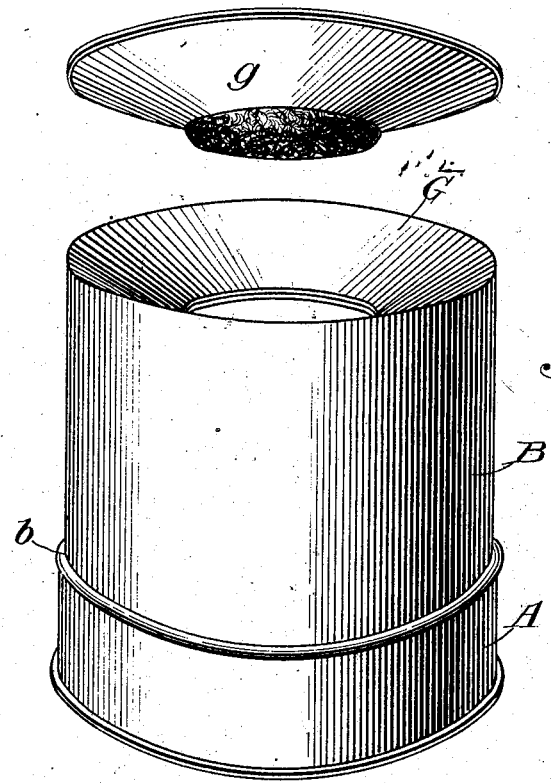
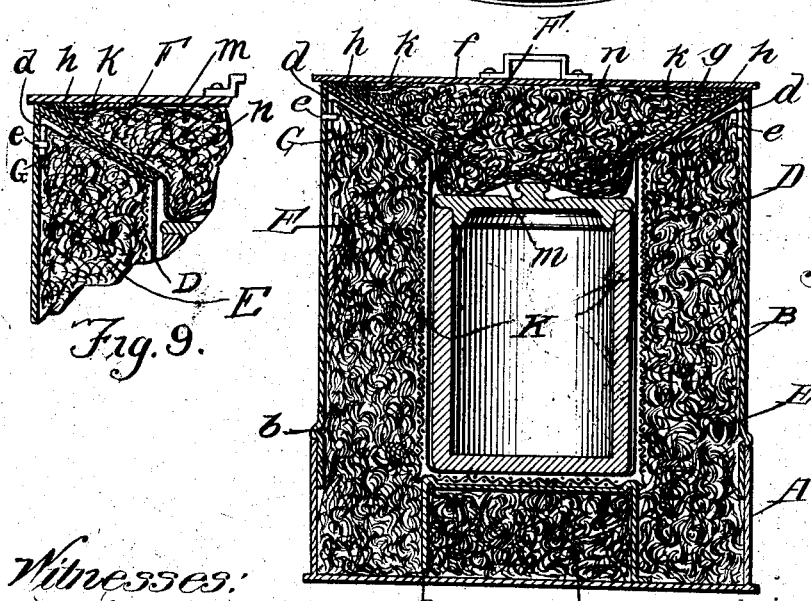

No. 786,999. PATENTED APR. 11, 1905.
C. N. ROUNSEVILLE.
HEAT STORAGE BOX.
APPLICATION FILED JAN. 18, 1904.
2 SHEETS—SHEET 2.
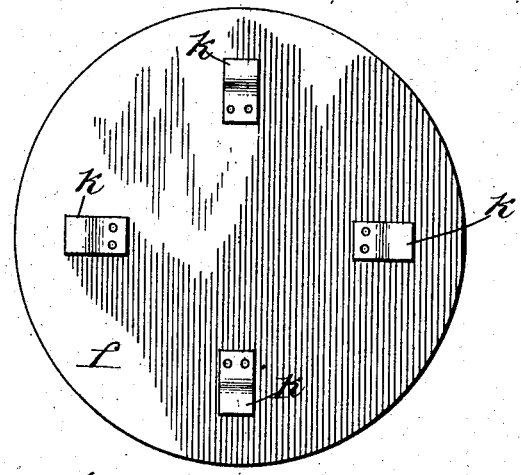
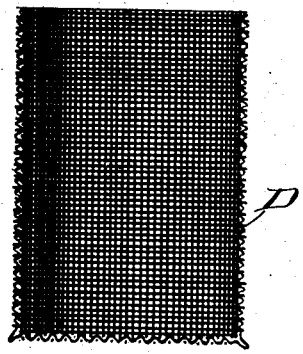
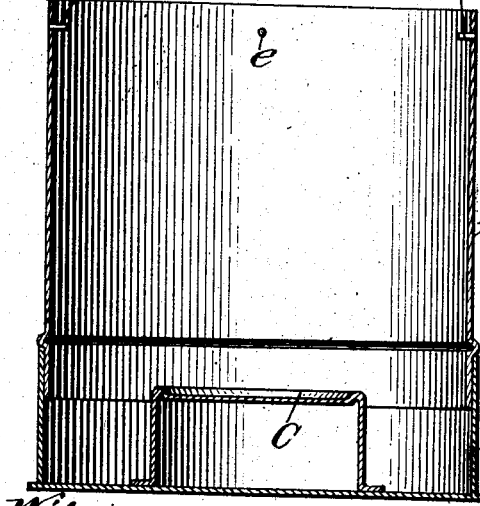
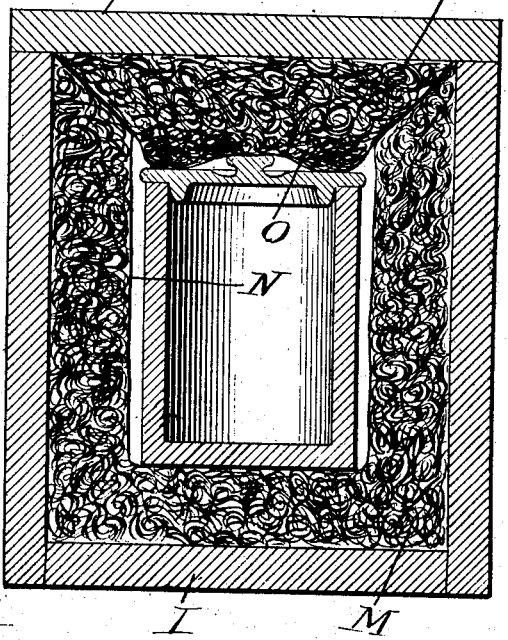
Inventor:
Christine N. Rounseville
by Frank D. Thomason
Attorney No. 786,999.

Patented April 11, 1905.

UNITED STATES PATENT OFFICE.

CHRISTINE N. ROUNSEVILLE, OF CHICAGO, ILLINOIS.

HEAT-STORAGE BOX.

SPECIFICATION forming part of Letters Patent No. 786,999, dated April 11, 1905.

Application filed January 18, 1904. Serial No. 189,596.

*To all whom it may concern:*

Be it known that I, CHRISTINE N. ROUNSEVILLE, a citizen of the United States, and a resident of Chicago, in the county of Cook and State of Illinois, have invented certain new and useful Improvements in Heat-Storage Boxes, of which the following is a full, clear, and exact description.

Heretofore food products of the culinary art, particularly those resulting from boiling, steaming, or cooking of vegetables or materials derived therefrom, have been directly subjected to the high degree of temperature of the heat-generator, whether stove, range, furnace, or oven, from the time they are first subjected to heat until they are, in so far as their subjection to heat is concerned, in a finished condition.

The object of my invention is after the cooking product has attained the maximum heat to which it is safe to subject it to remove it from the heat-generator and envelop it completely in a cabinet or box so constructed of non-conductive materials that there is an almost undiminished conservation of the heat of both the product and its receptacle for hours, thus practically cooking the product after its removal from the heat-generator in its own heat, saving the waste of fuel resulting from maintaining the temperature of said heat-generator, avoiding the burning of the cooking product, and thus economizing the constant time and attention otherwise required, and making it possible to prepare the cooked food a long time before it is to be eaten, and thus avoid the rush and fuss incident to serving several hot dishes or courses at any given meal. This I accomplish by the means hereinafter fully described, and as particularly pointed out in the claims.

In the drawings, Figure 1 is a perspective view of my invention, showing the cover thereof raised therefrom. Fig. 2 is a vertical transverse section of the same. Fig. 3 is a detail view of the top of the cover, showing the under side of the top plate thereof. Fig. 4 is a detail view of the side of the annular funnel-shaped asbestos retaining-plate forming a part of said cover. Fig. 5 shows in detail the annular funnel-shaped retaining-plate for the lining of the storage-box in section. Fig. 6 is a detail view showing a vertical central section of said storage-box. Fig. 7 is a detail view showing a vertical section of the wire cylindrical former for the inside of the storage-box. Fig. 8 is a vertical section of a modification of my invention. Fig. 9 is an enlarged view of a portion of Fig. 2.

Reference being had to the drawings, it will be observed that the principal parts of my invention comprise a casing or box, a cover, and the receptacle or utensil in which the cooking is done. The casing or box comprises a base-section A and an upper section B. The former consists of a circular or other suitably-shaped bottom plate, which has the lower portion of the side walls of the box arising therefrom to a suitable height, substantially as shown in the drawings, and has a circular platform C arising therefrom. The upper section consists of a metal cylinder of a suitable height, which is of a diameter corresponding to the inner circumference of the side walls of the lower portion and has an outwardly-protruding circumferential bead $b$ at a suitable distance above its lower edges, which rests upon the upper edges of the sides of the lower section when the lower portion of said upper section is inserted in the lower section, as shown in the drawings.

Seated on the platform C is a cylindrical cage or former D, which is preferably made of wire screening or other suitable perforate material. Between this former and the side walls of the box and below the top of the platform the space is filled with asbestos or mineral wool E or other heat-non-conducting material, and a bag of asbestos cloth F is inserted down into the former D, which serves as a lining of the interior chamber of the box and has its mouth flared outward, so as to spread out over the asbestos filling E to the top of the upper section B, where it is fastened by being clamped between the same and the mouth-piece G, suitable openings being provided to permit the angle-hooks to pass through said bag. The upper circular edge of the former terminates in a plane below the upper edge of the upper section B of the box, and resting on the said upper edges of these parts and at the same time serving to repress and confine the filling E is an annular mouth-plate G, which inclines downward from its outer edge, that rests upon the upper edges of the said upper section of the box, to its central opening, the diameter of which is slightly less than that of the mouth of the former, whose edges it overhangs slightly. This mouth-plate G is removably secured in the position indicated by means of hooks $d\ d$, depending down from its under side near the outer edge of said mouth-plate, which hooks engage pins $e\ e$, projecting inward from the sides of the box near the upper edge thereof, as shown in the drawings.

The cover of the storage-box above described consists of a disk $f$ of suitable material, whose diameter slightly exceeds that of said box and which has a suitable handle to lift it with. Secured to the under side of this disk is an annular funnel-shaped plate $g$, the downward inclination of which from its outer circumference to its central opening corresponds to the inclination of the mouth-plate G. This annular plate $g$ is preferably removably secured to disk $f$ by means of V-shaped arms $h\ h$, one branch of which is suitably secured in a radial position to the upper surface of said plate $g$ near its outer circumference and the other branch of which extends from the angle thereof radially toward the center and is caught when said plate $g$ is placed concentric against the under side of the disk and given a slight rotative movement under the radially-disposed arms $k\ k$, secured in suitable manner to the under side of said disk. Before plate $g$ is secured to disk $f$ a circular piece of asbestos cloth $m$ or other suitable heat-non-conducting fabric is placed in said plate $g$, and then asbestos or other suitable filling $n$ of heat-non-conducting material is placed in the same and the plate secured to the disk. The central opening of plate $g$ corresponds in diameter to the opening in plate G, and the quantity of the filling $n$ in the cover is such as to make the cloth $m$ bulge down through the same, making a sort of cushion, as it were, that when the pot or receptacle K is inserted in the central chamber of the box will bear down upon the same.

The operation of my invention, which is very simple, is as follows: The food to be cooked is placed in the receptacle K and placed in the stove or range and heated to the maximum heat to which it can safely be subjected. It is then removed from the stove and placed in the storage-box and the cover closed down over the same as soon as possible, so as to avoid any appreciable loss of heat. The heat of the receptacle and its contents can thus be retained for hours and said contents of the receptacle will undergo the same change as if subjected to the direct heat of the stove until "done," and the odor of the cooking material does not escape and scent up the house, and the stove, unless needed for other purposes, can be permitted to die out, and thus a great saving of fuel be accomplished.

I do not wish to be confined to the construction of my invention, for while such construction is desirable, because of the facility with which changes or substitutions of parts might be made—as, for instance, when it is desired to provide a box with a larger interior chamber than as shown without changing the dimensions of said box—yet the construction could be greatly simplified.

In Fig. 8 of the drawings I show a box I, the cylindrical portion and the bottom of which are made of a thick stiff asbestos composition, as well as the cover J of said box. The box is provided with a lining of loose asbestos M or other heat-non-conducting material, and the walls of the interior chamber is made simply of a bag N of a suitable non-conductive fabric, which is open at its top, has its upper edges flared outward and secured to the upper edges of the cylindrical portion of the box, and is surrounded by and filled in below it with the lining M. The under side of the cover J is also upholstered with asbestos cloth O and a filling P, of the loose asbestos or mineral wool, in such manner as to enable the marginal portion of the cover to fit and rest directly upon the upper edges of the box and by bearing against the upholstered lining of the box make said interior chamber absolutely tight. If desired, a former similar to the former D, hereinbefore described, may be used to define the sides of the interior chamber of the box. This change, as well as others that will suggest themselves as soon as my invention becomes known and is put in practice, I desire to be considered as within the scope of my invention so long as such variations thereof embody the idea of a heat-storage chamber surrounded by an inclosing heat-non-conducting medium on all sides.

What I claim as new is—

1. A heat-storage vessel provided with a suitable interior chamber comprising a flexible bag formed of heat-non-conducting fabric the mouth of which is secured to the top of said vessel; asbestos interposed between said bag and the walls of said vessel; a funnel-shaped mouth-plate partly closing said interior chamber provided with depending hooks the inclined clamping edges of which engage alining pins projecting radially inward near the top of said vessel; an interior vessel disposed within said interior chamber, less in height than the depth of said chamber; an inverted-frustum-shaped cover for said first-mentioned vessel having a cushion on the under side thereof closing the mouth of said bag and pressing down closely upon the top of said interior vessel; said cover comprising an annular funnel-shaped plate provided with inwardly-projecting V-shaped lugs and a circular top disk having radially-disposed arms that are deflected near their ends and interlock with the free ends of said V-shaped lugs.

2. A heat-storage vessel provided with a suitable interior chamber comprising a flexible bag formed of heat-non-conducting fabric the mouth of which is secured to the top of said vessel; asbestos interposed between said bag and the walls of said vessel; a funnel-shaped mouth-plate partly closing said interior chamber provided with depending hooks the inclined clamping edges of which engage alining pins projecting radially inward near the top of said vessel; an interior vessel disposed within said interior chamber, less in height than the depth of said chamber; and an inverted-frustum-shaped cover for said first-mentioned vessel having a cushion on the under side thereof closing the mouth of said bag and pressing down closely upon the top of said interior vessel, said cushion formed of heat-non-conducting fabric and filled with asbestos; said cover comprising an annular funnel-shaped plate provided with inwardly-projecting V-shaped lugs and a circular top disk having radially-disposed arms that are deflected near their ends and interlock with the free ends of said V-shaped lugs.

3. A heat-storage vessel provided with a suitable interior chamber comprising a flexible bag formed of heat-non-conducting fabric the mouth of which is secured to the top of said vessel; a woven-wire former defining the walls of said interior chamber; asbestos interposed between said bag and the walls of said vessel; a funnel-shaped mouth-plate partly closing said interior chamber provided with depending hooks the inclined clamping edges of which engage alining pins projecting radially inward near the top of said vessel; an interior vessel disposed within said interior chamber, less in height than the depth of said chamber; an inverted-frustum-shaped cover for said first-mentioned vessel having a cushion on the under side thereof closing the mouth of said bag and pressing down closely upon the top of said interior vessel; said cover comprising an annular funnel-shaped plate provided with inwardly-projecting V-shaped lugs and a circular top disk having radially-disposed arms that are deflected near their ends and interlock with the free ends of said V-shaped lugs.

4. A heat-storage vessel provided with a suitable interior chamber comprising a flexible bag formed of heat-non-conducting fabric the mouth of which is secured to the top of said vessel; a woven-wire former defining the walls of said chamber; asbestos interposed between said bag and the walls of said vessel; a funnel-shaped mouth-plate partly closing said interior chamber provided with depending hooks the inclined clamping edges of which engage alining pins projecting radially inward near the top of said vessel; an interior vessel disposed within said interior chamber, less in height than the depth of said chamber; an inverted-frustum-shaped cover for said first-mentioned vessel having a cushion on the under side thereof closing the mouth of said bag and pressing down closely upon the top of said interior vessel, said cushion formed of heat-non-conducting fabric and filled with asbestos; said cover comprising an annular funnel-shaped plate provided with inwardly-projecting V-shaped lugs and a circular top disk having radially-disposed arms that are deflected near their ends and interlock with the free ends of said V-shaped lugs.

5. A heat-storage vessel provided with a suitable interior chamber comprising a flexible bag formed of heat-non-conducting fabric the mouth of which is secured to the top of said vessel; a woven-wire former defining the walls of said interior chamber; a suitable platform supporting said former above the bottom of said vessel; asbestos interposed between said bag and the walls of said vessel; a funnel-shaped mouth-plate partly closing said interior chamber provided with depending hooks the inclined clamping edges of which engage alining pins projecting radially inward near the top of said vessel; an interior vessel disposed within said interior chamber, less in height than the depth of said chamber; an inverted-frustum-shaped cover for said first-mentioned vessel having a cushion on the under side thereof closing the mouth of said bag, and pressing down closely upon the top of said interior chamber; said cover comprising an annular funnel-shaped plate provided with inwardly-projecting V-shaped lugs and a circular top disk having radially-disposed arms that are deflected near their ends and interlock with the free ends of said V-shaped lugs.

6. A heat-storage vessel provided with a suitable interior chamber comprising a flexible bag formed of heat-non-conducting fabric the mouth of which is secured to the top of said vessel; a woven-wire former defining the walls of said interior chamber; a suitable platform supporting said former above the bottom of said vessel; asbestos interposed between said bag and the walls of said vessel; a funnel-shaped mouth-plate partly closing said interior chamber provided with depending hooks the inclined clamping edges of which engage alining pins projecting radially inward near the top of said vessel; an interior vessel disposed within said interior chamber, less in height than the depth of said chamber; an inverted-frustum-shaped cover for said first-mentioned vessel having a cushion on the under side thereof closing the mouth of said bag, and pressing down closely upon the top of said interior chamber, said cushion formed of heat-nonconducting fabric and filled with asbestos; said cover comprising an annular funnel-shaped plate provided with inwardly-projecting V-shaped lugs and a circular top disk having radially-disposed arms that are deflected near their ends and interlock with the free ends of said V-shaped lugs.

In testimony whereof I have hereunto set my hand this 15th day January, 1904.

CHRISTINE N. ROUNSEVILLE.

Witnesses:
    JOSEPH WRIGHT,
    JAS. W. SPENCER.